United States Patent Office 3,513,325
Patented May 19, 1970

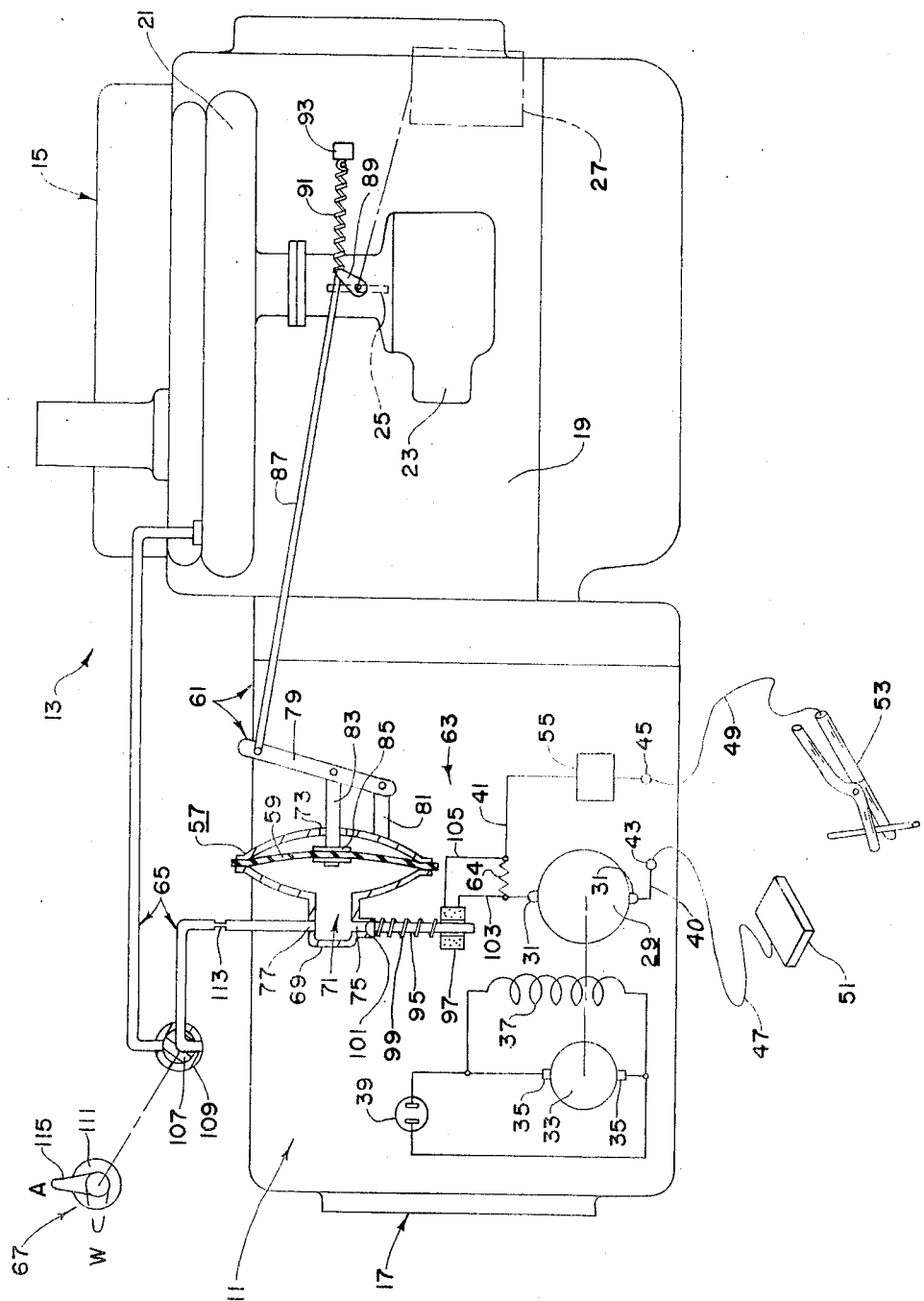

3,513,325
ELECTRIC WELDING MACHINE
SPEED CONTROL MEANS
Leon O. Tharp, 4574 Weaver Road,
Memphis, Tenn. 38109
Filed May 27, 1968, Ser. No. 732,237
Int. Cl. H02p 9/04
U.S. Cl. 290—40          3 Claims

ABSTRACT OF THE DISCLOSURE

An improvement in a gasoline engine powered portable type electric welding machine having dual electric current outlet means for energizing respectively either the electric arc welding electrodes or a power tool plugged in and connected with the exciter circuit of the welding generator—the improvement including control means for regulating the speed of the engine-generator respectively for high constant speed operation when utilizing exciter circuit current for power tool operation or for high and low fluctuating speed operation when the welding circuit is being utilized for welding. The control means includes electro-vacuum means for causing automatic speed control operation and hand valve means interposedly fitted in the vacuum supply line of the electro-vacuum means for selective operation of the welding machine either for welding or for supplying current for a power tool.

BACKGROUND OF THE INVENTION

(1) Field of the invention

It pertains generally to speed control means in an electric welding machine and to automatic and selective electro-vacuum operated control means.

(2) Description of the prior art

Various speed control means for welding machines have heretofore been designed and manufactured and such speed control means utilizing various principles of operation. The high and low fluctuating speed operation of a welder when it is being utilized for arc welding is particularly difficult to control accurately. Various so-called idler mechanisms have been utilized for automatically idling the engine-generator of the welding unit when the welding arc is broken or for idling the engine-generator when the generator is not supplying welding current. The idler mechanism also functions to open the throttle of the welding machine engine when the welding arc is struck and to maintain the engine at a high speed condition while the welding bead is being formed.

In welding machines having an exciter circuit in the welding generator and such machines wherein this circuit is utilized for energizing various power tools, the idler mechanism is generally used for holding the engine-generator at high speed; the idler control and control linkage was manipulated for maintaining the welding engine-generator at high speed for generating current sufficient to operate the particular power tool; typically, the user of the welding machine by manipulation of various pins and links would arrange the speed control means of the welder for maintaining the engine generator at high speed. In construction welding work not unusually there is a need for alternating the use of the welder between supplying power for a power tool and for general welding work. Heretofore, it has been necessary for the user of the prior machines to manipulate the welding linkage between the various controls desired and to arrange such controls in either a constant high speed for power tool curent supply or for high and low fluctuating speed operation for general welding work. Rearranging the idler mechanism from one or the other setting required several minutes and resulted in substantial time idle from the welding work. Also, substantial skill or practice and familiarization with the particular welding machine was necessary for changing the machine respectively to and from high constant speed operation and high and low fluctuating speed operation.

SUMMARY OF THE INVENTION

The present invention is in combination with an electric welding machine which includes flexible diaphragm means connected with the throttle of the welding machine engine and vacuum line means interconnecting the diaphragm with the fuel-air induction manifold of the engine. The vacuum of the engine is utilized for actuating the diaphragm and moving the engine throttle towards a closed disposition thereby idling the engine. Solenoid operative valve means is arranged in association with the vacuum chamber of the diaphragm for opening or closing the chamber to the atmosphere in response respectively to energizing or de-energizing the solenoid coil and respectively in response to making or breaking an electric welding arc. The present invention includes hand operative three-way type valve means interposedly fitted in the vacuum line communicating the diaphragm vacuum chamber with the fuel-air induction manifold of the engine. The hand valve means is selectively operable respectively between first and second positions for selectively arranging the speed control means of the welding machine in a high constant speed condition for power tool operation or in a high and low fluctuating speed condition for automatic control of the engine speed in welding work.

Brief description of the drawing

The drawing illustrates somewhat schematically the speed control means of the present invention and its environment in a welding machine.

Description of the preferred embodiment

The speed control means of the present invention is indicated by numeral 11 and will be described in conjunction with a welding unit 13 including an internal combustion gasoline engine 15 and electric current generator 17 drivingly coupled together. Engine 15 is of typical design and includes engine block means 19, fuel-air induction means including manifold 21, carburetor 23, and throttle valve 25. Engine 15 preferably includes a governor 27 (shown schematically in broken lines) connected with throttle valve 25 for regulating the throttle valve opening in response to engine load.

Generator 17 typically includes a welding circuit including main welding armature 29 and brushes 31, and an exciter circuit including an exciter armature 33 and brushes 35. In typical manner, exciter armature 33 is adapted for the dual function of exciting welding circuit field coil means 37 and for providing voltage at current outlet receptacle 39. The extension cord plug (not shown) of a power tool is adapted to be plugged into receptacle 39 for energizing the power tool by the exciter circuit means of generator 17.

The welding circuit means of generator 17 includes conductors 40, 41 connecting respectively brushes 31 with outlet terminals 43, 45. Extension cables 47, 49 connect respectively terminals 43, 45 to electrode means 51, 53. Hand adjustable voltage and current regulating means 55 is fitted in the main welding circuit for regulating the voltage and current output at welding electrode means 51, 53.

Speed control means 11 includes diaphragm means 57 including flexible diaphragm member 59; linkage means 61 mechanically interconnecting throttle valve 25 and diaphragm member 59; secondary circuit means 63 arranged in shunt relation with the main welding circuit of generator 17 (i.e., connected across a resistor 64 interposed in conductor 41); a vacuum line 65 operatively connecting diaphragm member 59 with engine fuel-air induction manifold 21; and hand valve means 67, interposedly fitted in vacuum line 65 for selectively opening or closing off passage of vacuumed air through the line.

Diaphragm means 57 includes a diaphragm housing 69 sealingly circumferentially embracing diaphragm member 59 and defining a chamber 71 on the inward side of the diaphragm member. Diaphragm housing 69 includes structure defining an aperture 73 communicating that side of diaphragm member 59 remote from chamber 71 to atmospheric pressure. Intake and exhaust passageways 75, 77 formed respectively in diaphragm housing 69 provides vacuumed air intake and exhaust passages for diaphragm chamber 71.

Linkage means 61 interconnecting diaphragm 59 and throttle valve 25 includes a vertically arranged lever 79 fulcrumed from diaphragm housing 69 at support 81; a stub shaft 83 secured at one end thereof by washer means 85 to the center portion of diaphragm member 59 and at the other end pivotally secured to lever 79; and a link rod 87 interconnecting diaphragm lever 79 with throttle lever 89. A helical extension spring 91 preferably is interposedly fitted between a support 93 and throttle lever 89 and urges throttle valve 25 to an open disposition. It will be understood that in certain applications of the present invention and in such applications wherein the gasoline engine is provided with governor means (indicated by numeral 27) the spring (91) may be dispensed with and the governor serve as spring means for urging the throttle to an open disposition.

Secondary circuit means 63 includes a valve member 95, a coil 97 and a helical compression spring 99 arranged concentrically about the shank of valve member 95. Head 101 of valve member 95 is sealingly urged against diaphragm housing 69 and normally occludes passageway 75. Energizing coil 97 pulls valve member head 101 from intake passageway 75 and permits atmospheric air to enter diaphragm chamber 71. Conductors 103, 105 connect coil 97 with main welding circuit conductor 41 and in parallel with resistor 64. Secondary circuit mean 63 is connected in shunt relation with the main welding circuit and when an arc is established across electrodes 51, 53, coil 97 is energized and valve member 95 pulled against spring 91 to an open disposition. When valve 95 is open, air pressure is equal on each side of diaphragm member 59 permitting spring 91 to move throttle valve 25 to an open disposition.

Hand valve means 67 includes a ported valve-barrel 107 turnably fitted in valve body 109 and includes knob means 111 for manipulating barrel 107 to a first or second position. A restriction 113, preferably arranged between hand valve means 67 and diaphragm chamber 71, restricts or meters the passage of vacuum air through line 65.

Knob 111 of hand valve means 97 may be arranged for high constant speed operation for energizing a power tool plugged into receptacle 39 by arranging knob 111 as illutrated in the drawing with pointer 115 being in the position indicated A (accessory load) or pointer 115 of knob 11 may be turned to the position indicated W (welding load) when the machine is to be used for welding. When knob pointer 115 is arranged in position A, diaphragm chamber 71 is open to the atmosphere thereby nullifying the action of diaphragm member 59 and permitting spring 91 to move throttle valve 25 open and cause the engine to run at a high speed. Turning knob pinter 115 to position W connects diaphragm chamber 71 with fuel-air induction manifold 21 and when valve member 95 is in a closed disposition, places chamber 71 under vacuum.

When pointer 115 is arranged in position W, the automatic operation of speed control means 11, in response to establishing or breaking a welding arc, is brought about in the following manner: When an arc is not established at electrodes 51, 53 and current is not passing through the welding or secondary circuits, coil 97 is deenergized and valve member 95 is seated. With valve 95 seated diaphragm chamber 71 is placed under vacuum, diaphragm member 59 moved inwardly, and throttle valve 25 through linkage means 61 is moved to a closed low idle disposition (not shown). In such a throttle condition, engine 15 is arranged at low idle speed. When an arc is struck and established at electrodes 51, 53, secondary circuit and coil 97 is energized thereby pulling valve 95 from its seat, permitting air to enter chamber 71, and permitting spring 91 to move the throttle to a high position. The high and low speed operation of the engine is automatically controlled and responsive respectively to making or breaking an arc across electrodes 51, 53.

While I have shown and described a preferred embodiment of the present invention, it will be understood that various changes and modifications in structure may be made without departing from the scope of the invention as defined in the claims.

I claim:

1. In a portable electric welding unit including current generating means including a welding circuit having current outlet terminals adapted for connection with the welding electrodes, and including an exciter circuit associated with said welding circuit having a current outlet receptacle adapted for connection with an electric power tool, and with said current generating means being powered by an internal combustion gasoline type engine having a throttle valve and fuel-air induction manifold means; control means for regulating the speed of said engine for high constant speed operation utilizing current generated by said exciter circuit to provide current to said outlet receptacle for electric power tools, said control means including flexible diaphragm means having a sealable vacuum chamber on one side of a diaphragm member and with the other side of said diaphragm member being open to atmospheric pressure, the center portion of said diaphragm member being adapted for inward and outward movement respectively toward and away from said vacuum chamber, linkage means connecting said center portion of said diaphragm member with the throttle valve of said engine for closing said throttle valve in response to inward movement of said diaphragm center portion and for opening said throttle valve in response to outward movement of said diaphragm center portion, a vacuum line communicating said vacuum chamber and said induction manifold, and hand valve means interposedly fitted in said vacuum line for selectively opening or closing off the passage of vacuumed air through said line and including means for venting said vacuum chamber to the atmosphere when the passage of said vacuumed air is closed off.

2. In a portable electric welding unit including current generating means including a welding circuit having current outlet terminals adapted for connection with the welding electrodes, and including an exciter circuit associated with said welding circuit having a current outlet receptacle adapted for connection with an electric power tool, and with said current generating means being powered by an internal combustion gasoline type engine having a throttle valve and fuel-air induction manifold means; control means for regulating the speed of said engine respectively for high constant speed operation utilizing current generated by said exciter circuit or for high and low fluctuating speed operation when the welding circuit is being utilized for welding, said control means including flexible diaphragm means having a sealable vacuum chamber on one side of a diaphragm member and with the other side of said diaphragm member being open to atmospheric pressure, the center portion of said diaphragm member being adapted for inward and outward movement respectively toward and away from said vacuum chamber, linkage means connecting said center portion of said diaphragm member with the throttle valve of said engine for closing said throttle valve in response to inward movement of said diaphragm center portion and for opening said throttle valve in response to outward movement of said diaphragm center portion, secondary circuit means arranged in shunt relation with said welding circuit, said secondary circuit including solenoid operative valve means including means including a valve member adapted to open and close a passageway in said vacuum chamber of said diaphragm means respectively for opening or closing said vacuum chamber to the atmosphere, a vacuum line communicating said vacuum chamber and said induction manifold, and hand valve means interposedly fitted in said vacuum line for selectively opening or closing off the passage of vacuumed air through said line.

3. The structure of claim 1 which additionally includes restriction means arranged in the passageway of said vacuum line for restricting the passage of vacuumed air through said line.

References Cited

UNITED STATES PATENTS 2,508,719   5/1950   Kern _____ 290—40 XR
2,924,722   2/1960   McClure _____ 290—40

GLEN R. SIMMONS, Primary Examiner

U.S. Cl. X.R.

290—51